(12) United States Patent
Li et al.

(10) Patent No.: US 12,507,105 B2
(45) Date of Patent: Dec. 23, 2025

(54) METHOD FOR CELL MEASUREMENT, TERMINAL DEVICE AND NETWORK DEVICE

(71) Applicant: GUANGDONG OPPO MOBILE TELECOMMUNICATIONS CORP., LTD., Guangdong (CN)

(72) Inventors: Haitao Li, Dongguan (CN); Yi Hu, Dongguan (CN); Qianxi Lu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 402 days.

(21) Appl. No.: 18/145,947

(22) Filed: Dec. 23, 2022

(65) Prior Publication Data

US 2023/0269617 A1    Aug. 24, 2023

Related U.S. Application Data

(63) Continuation of application No. PCT/CN2020/119655, filed on Sep. 30, 2020.

(51) Int. Cl.
*H04W 24/10* (2009.01)
*H04B 7/185* (2006.01)
*H04W 48/02* (2009.01)

(52) U.S. Cl.
CPC ........ *H04W 24/10* (2013.01); *H04B 7/18519* (2013.01)

(58) Field of Classification Search
CPC ..... H04W 48/16; H04W 24/10; H04W 48/20; H04W 16/28; H04W 84/06; H04W 24/08;
(Continued)

(56) References Cited

U.S. PATENT DOCUMENTS 6,377,563 B1 * 4/2002 Jeon .................... H04W 36/305
                                                 370/335
10,070,336 B2 * 9/2018 Gunnarsson .......... H04W 16/20
(Continued)

FOREIGN PATENT DOCUMENTS

CN          103026640 A      4/2013
CN          110557191 A      12/2019
(Continued)

OTHER PUBLICATIONS

First Office Action of the Chinese application No. 202080105255.8, issued on Jun. 19, 2024. 17 pages with English translation.
(Continued)

*Primary Examiner* — Sithu Ko
*Assistant Examiner* — Vanneilian Lalchinthang
(74) *Attorney, Agent, or Firm* — PERKINS COIE LLP

(57) ABSTRACT

Methods for cell measurement, a terminal device and a network device are provided. The method for cell measurement includes: a terminal device receiving system information message, the system information message including coverage information; the terminal device performing a cell measurement corresponding to a frequency point according to the system information message, the frequency point including a frequency point associated with a satellite.

20 Claims, 9 Drawing Sheets

(58) Field of Classification Search
CPC .............. H04W 36/0094; H04W 36/24; H04W 36/304; H04B 7/1851; H04B 17/382; H04B 7/18519; H04B 7/1853; H04B 7/2041; H04B 7/18513; H04B 7/18541; Y02D 30/70; H04J 3/0638
USPC ........................................................ 370/252
See application file for complete search history.

(56) References Cited

U.S. PATENT DOCUMENTS

| | | | |
|---|---|---|---|
| 10,274,604 B1* | 4/2019 | Liu | G01S 19/27 |
| 11,395,163 B2* | 7/2022 | Kazmi | H04W 24/08 |
| 11,990,980 B2* | 5/2024 | Fan | H04W 36/322 |
| 2011/0012780 A1* | 1/2011 | Alizadeh-Shabdiz | G01S 5/0263 |
| | | | 342/357.23 |
| 2012/0276946 A1* | 11/2012 | Sung | H04W 36/00837 |
| | | | 455/525 |
| 2020/0096648 A1* | 3/2020 | Zhou | G01S 19/07 |
| 2022/0086671 A1* | 3/2022 | Hong | H04W 16/28 |
| 2022/0225150 A1* | 7/2022 | Zheng | H04W 24/08 |
| 2022/0322176 A1* | 10/2022 | Geng | H04W 48/20 |
| 2023/0049063 A1* | 2/2023 | Wu | H04B 7/18513 |
| 2023/0055988 A1* | 2/2023 | Liberg | H04W 76/19 |

FOREIGN PATENT DOCUMENTS

| | | |
|---|---|---|
| CN | 111182594 A | 5/2020 |
| CN | 111328085 A | 6/2020 |
| CN | 111356185 A | 6/2020 |
| CN | 111356192 A | 6/2020 |
| CN | 111525950 A | 8/2020 |
| WO | 2015122821 A1 | 8/2015 |
| WO | 2019020178 A1 | 1/2019 |
| WO | 2020042959 A1 | 3/2020 |
| WO | 2020145559 A1 | 7/2020 |
| WO | WO-2020192454 A1 * | 10/2020 ......... H04B 7/18513 |

OTHER PUBLICATIONS

Second Office Action of the Chinese application No. 202080105255.8, issued on Aug. 24, 2024. 16 pages with English translation.
First Office Action of the European application No. 20955783.4, issued on Jul. 3, 2024. 6 pages.
International Search Report in the international application No. PCT/CN2020/119655, mailed on Jun. 30, 2021.
Written Opinion of the International Search Authority in the international application No. PCT/CN2020/119655, mailed on Jun. 30, 2021.
Thales, "Solutions for NR to support non-terrestrial networks (NTN)", 3GPP TSG RAN meeting #86, RP-193234, Dec. 9-13, 2019.
Huawei et al: "Discussion on RRC_IDLE mode issues in NTN", 3GPP Draft; R2-2007171, 3rd Generation Partnership Project (3GPP), Mobile Competence Centre; 650, Route Des Lucioles; F-06921 Sophia-Antipolis Cedex; France, vol. RAN WG2, No. Online; Aug. 17, 2020-Aug. 28, 2020, Aug. 7, 2020 (Aug. 7, 2020), XP052360289, sections 1, 2.1, 2.2. 4 pages.
Intel Corporation: "Conditional Handover for Non-Terrestrial Networks", 3GPP Draft; R2-1914739, 3rd Generation Partnership Project (3GPP), Mobile Competence Centre; 650, Route Des Lucioles; F-06921 Sophia-Antipolis Cedex; France, vol. RAN WG2, No. Reno, U.S.A.; Nov. 18, 2019-Nov. 22, 2019, Nov. 8, 2019 (Nov. 8, 2019), XP051816736, the whole document. 3 pages.
Supplementary European Search Report in the European application No. 20955783.4, mailed on Oct. 16, 2023. 13 pages.
Notice of Allowance of the Chinese application No. 202080105255.8, issued on Oct. 24, 2024. 6 pages with English translation.

* cited by examiner

A terminal device receives first indication information for instructing the terminal device whether to perform a cell measurement corresponding to a frequency point according to coverage information of a satellite — S300

FIG. 3

A network device sends a system information message to a terminal device. The system information message includes coverage information of a satellite and is used for performing a cell measurement corresponding to a frequency point — S400

FIG. 4

A network device sends first indication information for instructing a terminal device whether to perform a cell measurement corresponding to a frequency point according to coverage information of a satellite  ／ S500

FIG. 5

METHOD FOR CELL MEASUREMENT, TERMINAL DEVICE AND NETWORK DEVICE

CROSS-REFERENCE TO RELATED APPLICATION

This application is a continuation of International Patent Application No. PCT/CN2020/119655, filed on Sep. 30, 2020, the disclosure of which is hereby incorporated by reference in its entirety.

BACKGROUND

In the related art, how to further achieve energy saving of a terminal device when the terminal device performs a neighbor cell measurement corresponding to a frequency point is a goal that has always been pursued.

SUMMARY

The present disclosure relates to the technical field of wireless communication, and in particular to a method for cell measurement, a terminal device and a network device.

In order to solve the above technical problem, embodiments of the present disclosure provide a method for cell measurement, a terminal device and a network device, which may achieve energy saving of a terminal device when the terminal device performs a neighbor cell measurement corresponding to a frequency point.

In a first aspect, the embodiments of the present disclosure provide a method for cell measurement, which includes the following operation. A terminal device receives a system information message. The system information message comprises coverage information of a satellite. The terminal device performs a cell measurement corresponding to a frequency point according to the system information message. The frequency point includes a frequency point associated with the satellite.

In a second aspect, the embodiments of the present disclosure provide a method for cell measurement, which includes the following operation. A network device sends a system information message to a terminal device. The system information message comprises coverage information of a satellite and is used for performing a cell measurement corresponding to a frequency point. The frequency point includes a frequency point associated with the satellite.

In a third aspect, the embodiments of the present disclosure provide a terminal device, which includes a processor, a memory for storing a computer program executable by the processor, and a network interface. The processor is configured to run the computer program to control the network interface to receive a system information message. The system information message comprises coverage information of a satellite. The processor is configured to perform a cell measurement corresponding to a frequency point according to the system information message. The frequency point includes a frequency point associated with the satellite.

In a fourth aspect, the embodiments of the disclosure provide a network device, which includes a processor and a memory configured to store a computer program capable of running on the processor. The processor is configured to run the computer program to execute operations of the above method for cell measurement executed by the network device.

BRIEF DESCRIPTION OF THE DRAWINGS

FIG. 3 is a schematic diagram of another optional processing flow of a method for cell measurement according to an embodiment of the present disclosure.

FIG. 4 is a schematic diagram of another optional processing flow of a method for cell measurement according to an embodiment of the present disclosure.

FIG. 5 is a schematic diagram of another optional processing flow of a method for cell measurement according to an embodiment of the present disclosure.

DETAILED DESCRIPTION

Figure 1:
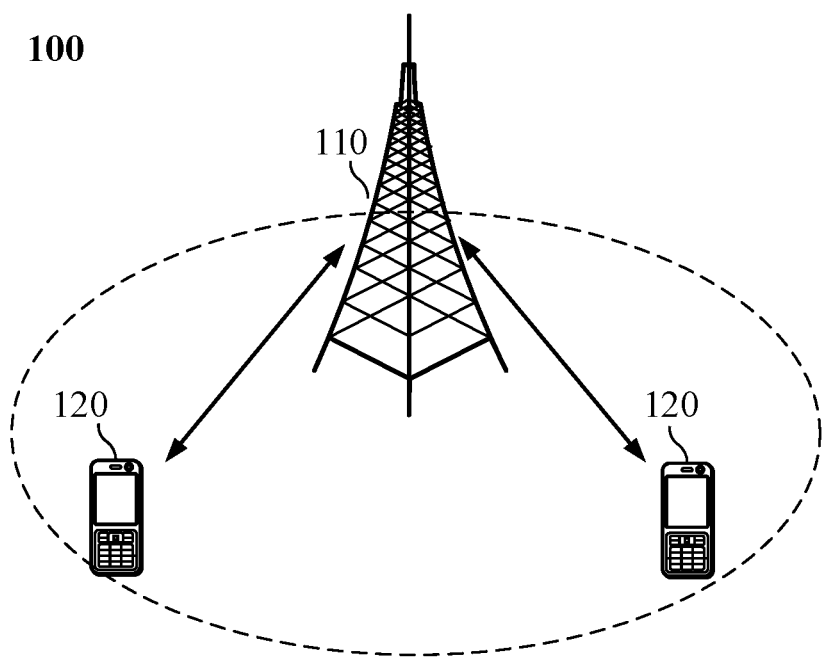
FIG. 1 is a schematic diagram of a composition structure of a communication system according to an embodiment of the present disclosure.

In order to provide a more detailed understanding of the features and technical contents of the embodiments of the present disclosure, implementation of the embodiments of the present disclosure will be described in detail below with reference to the accompanying drawings, and the accompanying drawings are for illustrative purposes only and are not intended to limit the embodiments of the present disclosure.

At present, with the people's pursuit of speed, delay, high-speed mobility and energy efficiency, and development of diversity and complexity of services in future life, the 3rd Generation Partnership Project (3GPP) International Organization for Standardization begins to develop 5th Generation Mobile Communication Technology (5G). Main application scenarios of 5G are: an Enhanced Mobile Broadband (eMBB), Ultra Reliable Low Latency Communications (URLLC), and Massive Machine Type Communication (mMTC).

The eMBB still aims to enable a user to obtain a multimedia content, service and data, and requirements thereof increase rapidly. On the other hand, since the eMBB may be deployed in different scenarios, for example, a room, an urban area and a rural area, and capabilities and requirements thereof are also greatly different, they cannot be generalized, and it is necessary to analyze in combination with a specific deployment scenario. Typical applications of the URLLC include industrial automation, power automation, remote medical operation (surgery), traffic safety guarantee and the like. Typical characteristics of the mMTC include high connection density, small data volume, delay-insensitive services, low cost and long service life of modules and the like.

A New Radio (NR) system may also be deployed independently, and a new Radio Resource Control (RRC) state, namely an RRC-Inactive state, is defined for the purpose of reducing air interface signaling, and quickly restoring wireless connections and data services. In an RRC-Idle state, mobility is cell reselection based on a terminal device, a paging process is initiated by a Core Network (CN), and a paging area is configured by the CN. There is no terminal device context and no RRC connection on the network device side. In the RRC-Inactive state, the mobility is cell reselection based on the terminal device, there exist a connection between the CN and the NR, the terminal device context exists on a certain network device. The paging process is triggered by a Radio Access Network (RAN), an RAN-based paging area is managed by the RAN, and the network device may know that location of the terminal device is based on an RAN-based paging area level.

Serving cells of the terminal devices in the RRC-Idle state and the RRC-Inactive state are continuously measured. Neighbor cell measurement behaviors of the RRC-Idle state and the RRC-Inactive state are restricted by relevant parameters in a system broadcast message.

For initiation of co-frequency measurement, when Srxlev of the serving cell is greater than SIntraSearchP and Squal of the serving cell is greater than SIntraSearchQ, co-frequency neighbor cell measurement is not initiated, otherwise the co-frequency neighbor cell measurement is initiated. For pilot frequency measurement of same-priority or low-priority, when Srxlev of the serving cell is greater than SnonIntraSearchP and Squal of the serving cell is greater than SnonIntraSearchQ, the pilot frequency measurement of same-priority or low-priority is not initiated, otherwise the pilot frequency measurement of same-priority or low-priority is initiated. For the pilot frequency measurement of high-priority, the it is always initiated. Herein, Srxlev is a current Srxlev measurement value of the serving cell, and SrxlevRef is a reference Srxlev value of the serving cell.

A Non-Terrestrial Network (NTN) provides a communication service for terrestrial users by means of satellite communication. Compared with terrestrial cellular network communication, the satellite communication has many unique advantages. Firstly, the satellite communication is not limited by regions of the users. For example, general terrestrial communication may not cover ocean, mountain, desert and other regions where communication devices may not be set up or communication coverage is not made due to the scarcity of population. For the satellite communication, since one satellite may cover a large area of the ground and the satellite may orbit around the earth, every corner of the earth may be covered with the satellite communication theoretically. Secondly, the satellite communication has a high social value. The satellite communication may cover remote mountain regions and poor and backward countries or regions at relatively low cost, so that people in these regions may enjoy advanced voice communication and mobile Internet technologies, which can help to narrow the digital divide with developed regions and promote development in these regions. Thirdly, the satellite communication distance is long, and the cost of communication may not be significantly increased with the increase of the communication distance. Finally, the satellite communication has high stability and may not be limited by natural disasters.

The communication satellites are classified into Low-Earth Orbit (LEO) satellites, Medium-Earth Orbit (MEO) satellites, Geostationary Earth Orbit (GEO) satellites, High Elliptical Orbit (HEO) satellites, and the like according to different orbital altitudes. A brief description of the LEO and the GEO is given below.

The orbital altitude of the LEO ranges from 500 km to 1500 km, and the corresponding orbital period is about 1.5 hours to 2 hours. Signal propagation delay of single-hop communication between the terminal devices is generally less than 20 ms. The maximum satellite visible time is 20 minutes. In this case, a signal propagation distance is short, link loss is small, and requirement for transmitting power of the terminal device is not high.

The orbital altitude of the GEO is 35,786 km and the rotation period around the earth is 24 hours. The signal propagation delay of single-hop communication between the terminal devices is generally 250 ms. In order to ensure the coverage of the satellite and improve system capacity of the entire satellite communication system, the satellite covers the ground by using multiple beams, and one satellite may form dozens or even hundreds of beams to cover the ground. One satellite beam may cover the ground area by a diameter of dozens to hundreds of kilometers.

The NTN cell may be deployed at a frequency point different from that of the terrestrial cell, and if the cell measurement is performed based on the frequency point according to the related art, the terminal device may always measure the frequency point where the NTN cell is deployed, even if the terminal device does not have any coverage of the NTN network at this time. In the related art, conditions for initiating the cell measurement on the frequency points with various priorities are mostly related to channel quality of the serving cell. However, since NTN network topology may change dynamically due to high-speed movement of low-orbit satellites, channel quality of the serving cell getting poor may not mean that the terminal device needs to measure the NTN frequency point. In this scenario, if the terminal device measures the frequency point where the NTN cell is deployed all the time, a large amount of power of the terminal device will be consumed.

Embodiments of the present disclosure provide a method for cell measurement. The method for cell measurement in the embodiments of the present disclosure may be applied to various communication systems, for example: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, an Advanced LTE (LTE-A) system, an NR system, an evolved system of the NR system, an LTE-based access to Unlicensed Spectrum (LTE-U) system, an NR-based access to Unlicensed spectrum (NR-U) system, a Universal Mobile Telecommunication System (UMTS), a Worldwide interoperability for Microwave Access (WiMAX) communication system, Wireless Local Area Networks (WLAN), Wireless Fidelity (WiFi), a next-generation communication system, or other communication systems.

Generally, traditional communication systems support a limited number of connections and are easy to implement. However, with the development of the communication technology, mobile communication systems will not only support traditional communications, but also support communications such as Device to Device (D2D) communication, Machine to Machine (M2M) communication, Machine Type Communication (MTC), and Vehicle to Vehicle (V2V) communication, etc. The embodiments of the present disclosure may also be applied to these communication systems.

System architectures and service scenarios described in the embodiments of the present disclosure are intended to describe the technical solution in the embodiments of the present disclosure more clearly, but are not intended to limit the technical solution provided in the embodiments of the present disclosure. Those of ordinary skill in the art may know that as the network architecture evolves and a new service scenario emerges, the technical solution provided in the embodiments of the present disclosure are also applicable to a similar technical problem.

The network device involved in the embodiments of the present disclosure may be a common base station (such as NodeB (NB) or eNB or gNB), an NR controller, a centralized unit, an NR base station, a remote radio frequency module, a micro base station, a relay, a distributed unit, a Transmission Reception Point (TRP), a Transmission Point (TP) or any other devices. There are no limits made to specific technologies and specific device forms adopted by the network device in the embodiments of the present disclosure. In order to facilitate description, in all embodiments of the present disclosure, the above apparatuses provided for the terminal device with a wireless communication function are collectively referred to a network device.

In the embodiments of the present disclosure, the terminal device may be any terminal. For example, the terminal device may be User Equipment (UE) in MTC. That is to say, the terminal device may also be called the UE, a Mobile Station (MS), a mobile terminal, a terminal, etc. The terminal device may communicate with one or more core networks through an RAN. For example, the terminal device may be a mobile terminal (or referred to as a "cellular" phone) and a computer with a mobile terminal. For example, the terminal device may also be a portable, pocket-sized, hand-held, computer built-in, or in-vehicle mobile apparatus, which exchanges language and/or data with the RAN. No specific limits are made thereto in the embodiments of the present disclosure.

Optionally, the network device and the terminal device may be deployed on land, including indoors or outdoors, and may be held in hands or deployed in vehicles, or may be deployed on water, or may be deployed on an aircraft, a balloon, and an artificial satellite in the air. There are no limits made to application scenarios of the network device and the terminal device in the embodiments of the present disclosure.

Optionally, communication may be performed between the network device and the terminal device and between the terminal devices through a licensed spectrum, or through an unlicensed spectrum, or through the licensed spectrum and the unlicensed spectrum simultaneously. Communication between the network device and the terminal device and between the terminal devices may be performed through a spectrum below 7 GigaHertz (GHz), or through a spectrum above 7 GHz, or through the spectra below 7 GHz and above 7 GHz simultaneously. There are no limits made to the spectrum resource used between the network device and the terminal device in the embodiments of the present disclosure.

Generally, traditional communication systems support a limited number of connections and are easy to implement. However, with the development of the communication technology, mobile communication systems will not only support traditional communication, but also support, for example, D2D communication, M2M communication, MTC, and V2V communication, etc. The embodiments of the present disclosure may also be applied to these communication systems.

Exemplarily, a communication system 100 applied in the embodiments of the present disclosure are illustrated in FIG. 1. The communication system 100 may include a network device 110, and the network device 110 may be a device communicating with a terminal device 120 (or called a communication terminal or a terminal). The network device 110 may provide communication coverage for a specific geographical region and may communicate with terminal devices located in the coverage. Optionally, the network device 110 may be a Base Transceiver Station (BTS) in the GSM or the CDMA system, an NB in the WCDMA system, and an Evolutional Node B (eNB or eNodeB) in the LTE system or a wireless controller in a Cloud Radio Access Network (CRAN). Alternatively, the network device may be a mobile switching center, a relay station, an access point, a vehicle device, a wearable device, a hub, a switch, a network bridge, a router, a network-side device in a 5G network, a network device in a future evolved Public Land Mobile Network (PLMN) or the like.

The communication system 100 further includes at least one terminal device 120 within the coverage of the network device 110. The "terminal device" used herein includes but not limited to, a device configured to receive/send a communication signal through a wired line connection, for example, a Public Switched Telephone Network (PSTN), a Digital Subscriber Line (DSL), a digital cable and a direct cable connection, and/or another data connection/network, and/or through a wireless interface, for example, a cellular network, a WLAN, a digital television network like a Digital Video Broadcasting-Handheld (DVB-H) network, a satellite network and an Amplitude Modulated (AM)-Frequency Modulated (FM) broadcast transmitter, and/or through another communication terminal, and/or through an Internet of Things (IoT) device. The terminal device configured to communicate through a wireless interface may be called a "wireless communication terminal", a "wireless terminal" or a "mobile terminal". Examples of a mobile terminal include but not limited to, a satellite or cellular telephone, a Personal Communication System (PCS) terminal capable of combining a cellular radio telephone and data processing, faxing and data communication capabilities, a Personal Digital Assistant (PDA) including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, other processing devices connected to a wireless modem, a vehicle device, a wearable device, a terminal device in the 5G network or in the future evolved PLMN or the like.

Optionally, the terminal devices 120 may perform D2D communication.

Optionally, the 5G system or the 5G network may also be called an NR system or an NR network.

One network device and two terminals are exemplarily illustrated in FIG. 1. Optionally, the communication system 100 may include multiple network devices and another number of terminals may be included in coverage of each network device. There are no limits made thereto in the embodiments of the present disclosure.

Optionally, the communication system 100 may further include other network entities such as a network controller and a mobility management entity. There are no limits made thereto in the embodiments of the present disclosure.

It is to be understood that a device with a communication function in the network/system in the embodiments of the present disclosure may be called a communication device. Taking the communication system 100 illustrated in FIG. 1 as an example, communication devices may include the network device 110 and terminal device 120 with the communication function, and the network device 110 and the terminal device 120 may be the specific devices mentioned above and will not be elaborated herein. The communication devices may further include other devices in the communication system 100, for example, other network entities like a network controller and a mobility management entity. There are no limits made thereto in the embodiments of the present disclosure.

Figure 2:
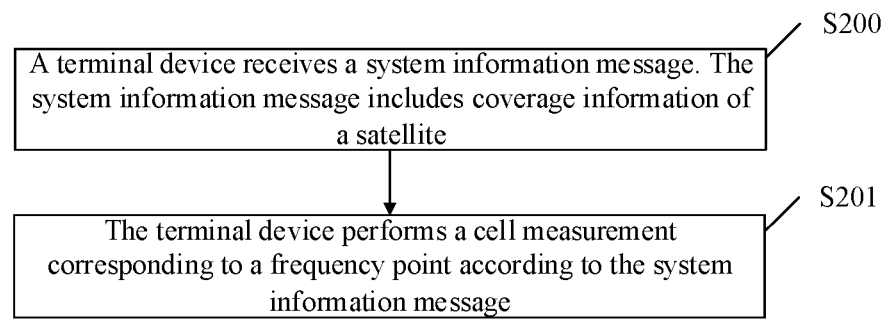
FIG. 2 is a schematic diagram of an optional processing flow of a method for cell measurement according to an embodiment of the present disclosure.

FIG. 2 shows an optional processing flow of a method for cell measurement applied to a terminal device according an embodiment of the present disclosure, which includes the following operations.

At S200, a terminal device receives a system information message. The system information message includes coverage information of a satellite.

At S201, the terminal device performs a cell measurement corresponding to a frequency point according to the system information message.

Another optional processing flow of a method for cell measurement applied to a terminal device according an embodiment of the present disclosure, as shown in FIG. 3, includes the following operations.

At S300, a terminal device receives first indication information for instructing the terminal device whether to perform a cell measurement corresponding to a frequency point according to coverage information of a satellite.

In some embodiments, the frequency point is a frequency point associated with the satellite.

In some embodiments, the terminal device receives the first indication information from a network device.

In a specific implementation, for a terminal device in an RRC-Idle state or an RRC-Inactive state, the terminal device may receive the first indication information from the network device through a system information message. For a terminal device in a connected state, the terminal device may receive the first indication information from the network device through the system information message, and may also receive the first indication information from the network device through RRC signaling.

In some embodiments, when the first indication information is used for instructing the terminal device to perform the cell measurement corresponding to the frequency point according to the coverage information of the satellite cell, the terminal device also receives second indication information for indicating ephemeris information of the satellite and/or coverage information of the satellite.

In some embodiments, the first indication information and the second indication information may be carried in a same message, or may also be carried in different messages. For example, for the terminal device in the RRC-Idle state or the RRC-Inactive state, the first indication information and the second indication information may be carried in a same system information message, or the first indication information and the second indication information may be carried in two different system information messages. For the terminal device in the connected state, the first indication information and the second indication information may be carried in a same system information message, or may be carried in the same RRC signaling; the first indication information and the second indication information may also be carried in two different system information messages, or may be carried in two different pieces of RRC signaling; or one of the first indication information and the second indication information may be carried in the system information message and the other one may be carried in the RRC signaling.

In some embodiments, the ephemeris information of the satellite may be actual physical location information of the satellite. The coverage information of the satellite may include at least one of: an elevation angle threshold between the terminal device and the satellite, a first distance threshold between the terminal device and the satellite, a second distance threshold between the terminal device and a reference point, or location information of the reference point. Herein, the elevation angle threshold, the first distance threshold and the second distance threshold may all be configured by the network device, or may all be preset. The reference point may be a center of ground location covered with the satellite, such as a central area or central location of the ground location covered with the satellite.

In some optional implementations, when the first indication information is used for instructing the terminal device to perform the cell measurement corresponding to the frequency point according to the coverage information of the satellite, the method for cell measurement may further include the following operation.

At S301, the terminal device measures all cells corresponding to the frequency point when a measurement starting condition is satisfied.

In some embodiments, the measurement starting condition is associated with location information of the terminal device and/or the ephemeris information of the satellite.

In a specific implementation, the measurement starting conditions may include at least one of: an elevation angle between the terminal device and the satellite being greater than or equal to the elevation angle threshold, a distance between the terminal device and the satellite being less than or equal to the first distance threshold, or a distance between the terminal device and the reference point being less than or equal to the second distance threshold. Herein, being greater than or equal to is also understood to be not less than, and being less than or equal to is also understood to be not more than.

Alternatively, in a specific implementation, the measurement starting condition may also include at least one of: the elevation angle between the terminal device and the satellite being greater than the elevation angle threshold, the distance between the terminal device and the satellite being less than the first distance threshold, or the distance between the terminal device and the reference point being less than the second distance threshold.

In some embodiments, the operation that terminal device measures all the cells corresponding to the frequency point may be the operation that that the terminal device measures all satellite cells deployed at the frequency point. For example, a satellite 1 is associated with a frequency point f1, and the frequency point f1 is associated with N satellites. When the measurement starting condition is satisfied, the terminal device performs the cell measurement on N cells.

In another optional implementation, when the first indication information is used for instructing the terminal device to perform the cell measurement corresponding to the frequency point according to the coverage information of the satellite, the method for cell measurement may further include the following operation.

At S302, the terminal device measures a cell corresponding to the satellite when the measurement starting condition is satisfied.

In some embodiments, the measurement starting condition is associated with the location information of the terminal device and/or the ephemeris information of the satellite.

In a specific implementation, the measurement starting condition may include at least one of: the elevation angle between the terminal device and the satellite being greater than or equal to the elevation angle threshold, the distance between the terminal device and the satellite being less than or equal to the first distance threshold, or the distance between the terminal device and the reference point being less than or equal to the second distance threshold. Herein, being greater than or equal to is also understood to be not less than, and being less than or equal to is also understood to be not more than.

Alternatively, in a specific implementation, the measurement starting condition may also include at least one of: the elevation angle between the terminal device and the satellite being greater than the elevation angle threshold, the distance between the terminal device and the satellite being less than the first distance threshold, or the distance between the terminal device and the reference point being less than the second distance threshold.

In some embodiments, the operation that the terminal device measures all the cells corresponding to the frequency point may be the operation that the terminal device only measures the cell corresponding to the satellite. For example, the satellite 1 is associated with the frequency point f1, and the frequency point f1 is associated with N satellites. When the measurement starting condition is satisfied, the terminal device performs the cell measurement on a cell corresponding to the satellite 1.

In still other optional implementations, when the first indication information is used for instructing the terminal device to perform the cell measurement corresponding to the frequency point according to the coverage information of the satellite, the method may further include the following operation.

At S303, the terminal device measures all the cells corresponding to the frequency point when signal quality of a serving cell is less than a first threshold and the measurement starting condition is satisfied.

In some embodiments, the signal quality of the serving cell may include at least one of: a Reference Signal Receiving Power (RSRP), Reference Signal Receiving Quality (RSRQ), or a Signal to Interference plus Noise Ratio (SINR). The first threshold may be configured by the network device or may be preset.

In some embodiments, the measurement starting condition is related to the location information of the terminal device and/or the ephemeris information of the satellite.

In specific implementation, the measurement starting condition may include at least one of: the elevation angle between the terminal device and the satellite being greater than or equal to the elevation angle threshold, the distance between the terminal device and the satellite being less than or equal to the first distance threshold, or the distance between the terminal device and the reference point being less than or equal to the second distance threshold. Herein, being greater than or equal to is also understood to be not less than, and being less than or equal to is also understood to be not more than.

Alternatively, in a specific implementation, the measurement starting condition may also include at least one of: the elevation angle between the terminal device and the satellite being greater than the elevation angle threshold, the distance between the terminal device and the satellite being less than the first distance threshold, or the distance between the terminal device and the reference point being less than the second distance threshold.

In some embodiments, the operation that terminal device measures all the cells corresponding to the frequency point may be the operation that the terminal device measures all the satellite cells deployed at the frequency point. For example, the satellite 1 is associated with the frequency point f1, and the frequency point f1 is associated with N satellites. When the measurement starting condition is satisfied, the terminal device performs the cell measurement on N cells.

In yet other optional implementations, when the first indication information is used for instructing the terminal device to perform the cell measurement corresponding to the frequency point according to the coverage information of the satellite, the method may further include the following operation.

At S304, the terminal device measures the cell corresponding to the satellite when the signal quality of the serving cell is less than the first threshold value and the measurement starting condition is satisfied.

In some embodiments, the signal quality of the serving cell may include at least one of: the RSRP, the RSRQ or the SINR. The first threshold may be configured by the network device or may be preset.

In some embodiments, the measurement starting condition is associated the location information of the terminal device and/or the ephemeris information of the satellite.

In a specific implementation, the measurement starting condition may include at least one of: the elevation angle between the terminal device and the satellite being greater than or equal to the elevation angle threshold, the distance between the terminal device and the satellite being less than or equal to the first distance threshold, or the distance between the terminal device and the reference point being less than or equal to the second distance threshold. Herein, being greater than or equal to is also understood to be not less than, and being less than or equal to is also understood to be not more than.

Alternatively, in a specific implementation, the measurement starting condition may also include at least one of: the elevation angle between the terminal device and the satellite being greater than the elevation angle threshold, the distance between the terminal device and the satellite being less than the first distance threshold, or the distance between the terminal device and the reference point being less than the second distance threshold.

In some embodiments, the operation that terminal device measures all the cells corresponding to the frequency point may be the operation that the terminal device may only measure the cell corresponding to the satellite. For example, the satellite 1 is associated with the frequency point f1, and the frequency point f1 is associated with the N satellites. When the measurement starting condition is satisfied, the terminal device performs cell measurement on the cell corresponding to the satellite 1.

The above operations S301-S304 respectively illustrate four optional implementations for the terminal device to start the cell measurement. In a case where the terminal device has already executed the cell measurement, the terminal device may also stop cell measurement in some scenarios. The case where the terminal device stops cell measurement is described below.

After the terminal device executes any one of the operations S301-S304, the method for cell measurement may further include the operation that the terminal device stops cell measurement.

In some optional implementations, the operation that the terminal device stops cell measurement may include the following operation.

At S3011, the terminal device stops measuring all cells corresponding to the frequency point when all satellites associated with the frequency point satisfy a measurement stopping condition.

For example, the satellite 1 is associated with the frequency point f1, and the frequency point f1 is associated with the N satellites. When all the N satellite cells satisfy the measurement stopping condition, the terminal device stops measuring all the cells corresponding to the frequency point.

In some embodiments, the measurement stopping condition is associated with the location information of the terminal device and/or the ephemeris information of the satellite.

In a specific implementation, the measurement stopping condition may include at least one of: the elevation angle between the terminal device and the satellite being less than the elevation angle threshold, the distance between the terminal device and the satellite being greater than the first distance threshold, or the distance between the terminal device and the reference point being greater than the second distance threshold.

Alternatively, in a specific implementation, the measurement stopping conditions may further include at least one of: the elevation angle between the terminal device and the satellite being less than or equal to the elevation angle threshold, the distance between the terminal device and the satellite being greater than or equal to the first distance threshold, or the distance between the terminal device and the reference point being greater than or equal to the second distance threshold. Herein, being greater than or equal to is also understood to be not less than, and being less than or equal to is also understood to be not more than.

In other optional implementations, the operation that the terminal device stops cell measurement may include the following operation.

At S3012, the terminal device stops measuring all the cells corresponding to the frequency point when at least one satellite associated with the frequency point satisfies the measurement stopping condition.

For example, the satellite 1 is associated with the frequency point f1, and the frequency point f1 is associated with the N satellites. When one of the N satellites satisfies the measurement stopping condition, the terminal device stops measuring all the cells corresponding to the frequency point.

In some embodiments, the measurement stopping condition is associated with the location information of the terminal device and/or the ephemeris information of the satellite.

In a specific implementation, the measurement stopping condition may include at least one of: the elevation angle between the terminal device and the satellite being less than the elevation angle threshold, the distance between the terminal device and the satellite being greater than the first distance threshold, or the distance between the terminal device and the reference point being greater than the second distance threshold.

Alternatively, in a specific implementation, the measurement stopping condition may further include at least one of: the elevation angle between the terminal device and the satellite being less than or equal to the elevation angle threshold, the distance between the terminal device and the satellite being greater than or equal to the first distance threshold, or the distance between the terminal device and the reference point being greater than or equal to the second distance threshold. Herein, being greater than or equal to is also understood to be not less than, and being less than or equal to is also understood to be not more than.

It is to be noted that in the embodiments of the present disclosure, the operation that terminal device performs the cell measurement may mean that the terminal device performs a neighbor cell measurement. The cell may refer to the satellite cell, and the satellite cell may refer to a cell covered with satellite network or a cell covered with a non-terrestrial communication network.

FIG. 4 shows an optional processing flow of a method for cell measurement applied to a network device according an embodiment of the present disclosure, which includes the following operation.

At S400, a network device sends a system information message to a terminal device. The system information message includes coverage information of a satellite and is used for performing a cell measurement corresponding to a frequency point.

Another optional processing flow of a method for cell measurement applied to a network device according an embodiment of the present disclosure is illustrated in FIG. 5, the method for cell measurement includes the following operation.

At S500, a network device sends first indication information for instructing a terminal device whether to perform a cell measurement corresponding to a frequency point according to coverage information of a satellite.

In some embodiments, the frequency point is a frequency point associated with the satellite.

In some embodiments, the network device sends the first indication information to the terminal device.

In a specific implementation, for a terminal device in an RRC-Idle state or an RRC-Inactive state, the network device may send the first indication information to the terminal device through a system information message. For a terminal device in a connected state, the network device may send the first indication information to the terminal device through the system information message, or may also send the first indication information to the terminal device through RRC signaling.

In some embodiments, when the first indication information is used for instructing the terminal device to perform the cell measurement corresponding to the frequency point according to the coverage information of the satellite cell, the network device also sends second indication information to the terminal device, the second indication information is used for indicating ephemeris information of the satellite and/or coverage information of the satellite.

In some embodiments, the first indication information and the second indication information may be carried in a same message, or may also be carried in different messages. For example, for the terminal device in the RRC-Idle state or the RRC-Inactive state, the first indication information and the second indication information may be carried in a same system information message, or the first indication information and the second indication information may be carried in two different system information messages. For the terminal device in the connected state, the first indication information and the second indication information may be carried in the same system information message, or may be carried in the same RRC signaling; the first indication information and the second indication information may also be carried in two different system information messages, or may be carried in two different pieces of RRC signaling; or one of the first indication information and the second indication information may be carried in the system information message and the other one may be carried in the RRC signaling.

In some embodiments, the ephemeris information of the satellite may be actual physical location information of the satellite. The coverage information of the satellite may include at least one of: an elevation angle threshold between the terminal device and the satellite, a first distance threshold between the terminal device and the satellite, a second distance threshold between the terminal device and a reference point, or location information of the reference point. Herein, the elevation angle threshold, the first distance threshold and the second distance threshold may all be configured by the network device, or may all be preset. The reference point may be a center of ground location covered with the satellite, such as a central area or central location of the ground location covered with the satellite.

In some embodiments, the network device determines whether the terminal device to perform the cell measurement corresponding to the frequency point according to the coverage information of the satellite based on a cell deployed at the frequency point.

In a specific implementation, when both a satellite cell and a terrestrial cell are deployed at the frequency point, the first indication information is used for instructing the terminal device not to perform the cell measurement corresponding to the frequency point according to the coverage information of the satellite. In this scenario, the terminal device determines whether to perform a neighbor cell measurement according to signal quality of a serving cell in the related art. Accordingly, when the terminal device performs the neighbor cell measurement according to the signal quality of the serving cell, the terminal device also stops the neighbor cell measurement according to the signal quality of the serving cell. The specific implementation process of the terminal device executing the neighbor cell measurement or stopping the neighbor cell measurement according to the signal quality of the serving cell is the same as that in the related art, which will not be elaborated here.

In a specific implementation, when only the satellite cell is deployed at the frequency point, the first indication information is used for instructing the terminal device to perform the cell measurement corresponding to the frequency point according to the coverage information of the satellite. It is to be noted that in the embodiment of the present disclosure, the terminal device executing the cell measurement may mean that the terminal device performs the neighbor cell measurement. The cell may refer to the satellite cell, and the satellite cell may refer to the cell covered with a satellite network.

It is to be noted that in the embodiments of the present disclosure, the terminal device executing the cell measurement may mean that the terminal device performs the neighbor cell measurement. The cell may refer to the satellite cell, and the satellite cell may refer to the cell covered with the satellite network or the cell covered with the non-terrestrial communication network.

Figure 6:
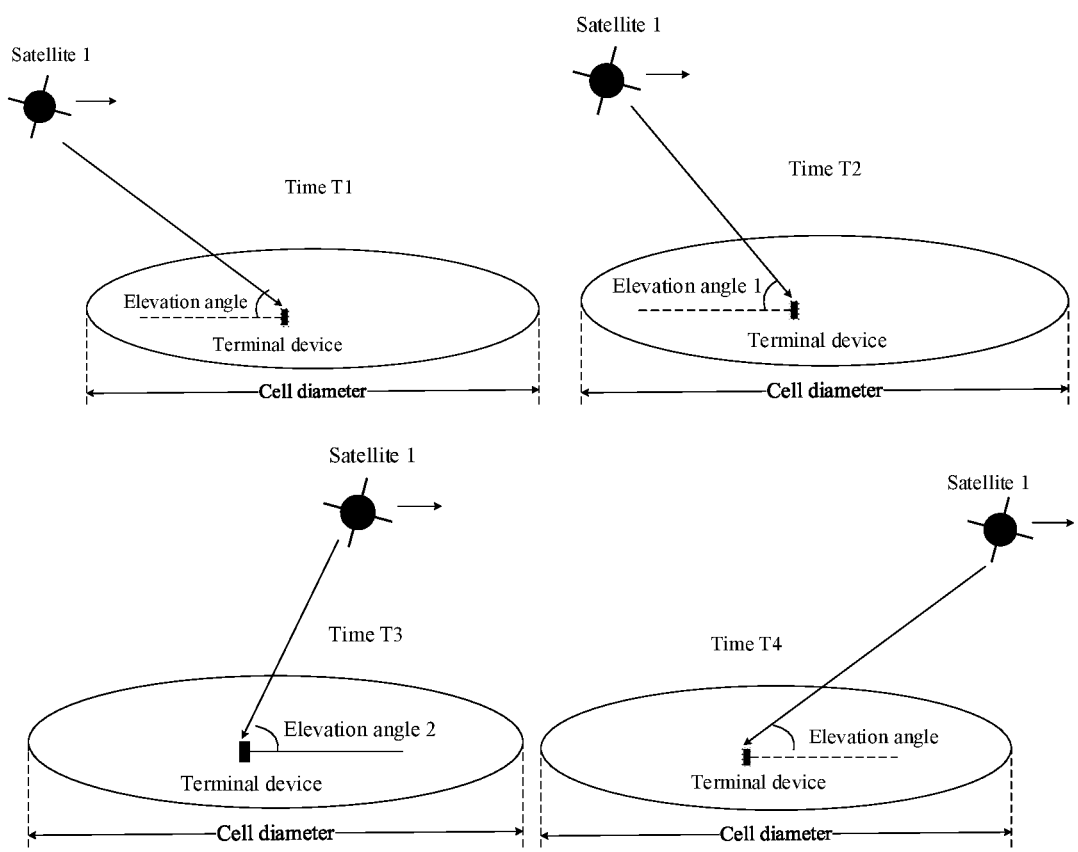
FIG. 6 is an optional schematic diagram of a terminal device executing measurement or stopping measurement on a neighbor cell corresponding to a frequency point according to an embodiment of the present disclosure.

Based on the above description of the method for cell measurement in FIGS. 2 to 5, in the embodiment of the present disclosure, an optional schematic diagram of the terminal device executing measurement or stopping measurement on the neighbor cell corresponding to the frequency point is illustrated in FIG. 6. At time T1, the terminal device measures that the elevation angles between the terminal device and all the satellites on the frequency point f1 associated with the satellite 1 are less than the elevation angle threshold, and the terminal device does not start neighbor cell measurement corresponding to the frequency point f1. At time T2, the terminal device measures that the elevation angle 2 between the terminal device and the satellite 1 is greater than the elevation angle threshold, and the terminal device starts the neighbor cell measurement corresponding to the frequency point f1. At time T3, as the satellite moves, the elevation angle 3 between the terminal device and the satellite 1 measured by the terminal device is still greater than the elevation angle threshold, and the terminal device continues the neighbor cell measurement corresponding to the frequency point f1. At time T4, as the satellite moves, the terminal device measures that the elevation angles between the terminal device and all the satellites on the frequency point f1 associated with the satellite 1 are less than the elevation angle threshold, and the terminal device stops the neighbor cell measurement corresponding to the frequency point f1.

The network device sends the first indication information to the terminal device, the first indication information is used for instructing the terminal device whether to perform the cell measurement corresponding to the frequency point according to the coverage information of the satellite, and the frequency point includes the frequency point associated with the satellite. In such way, the terminal device may determine whether to perform the cell measurement corresponding to the frequency point according to the coverage information of the satellite based on the instruction of the network device. In addition, only when the measurement starting condition is satisfied, the terminal device performs the neighbor cell measurement corresponding to the frequency point. When the measurement stopping condition is satisfied, the terminal device stops the neighbor cell measurement corresponding to the frequency point. Since the measurement starting condition and measurement stopping condition are associated with the location information of the terminal device and the ephemeris information of the satellite, so that the terminal device may only perform the cell measurement corresponding to the frequency point when approaching the coverage of the satellite, and the terminal device stops the neighbor cell measurement corresponding to the frequency point when being far away from the coverage of the satellite, thereby achieving energy saving of the terminal device.

Figure 7:
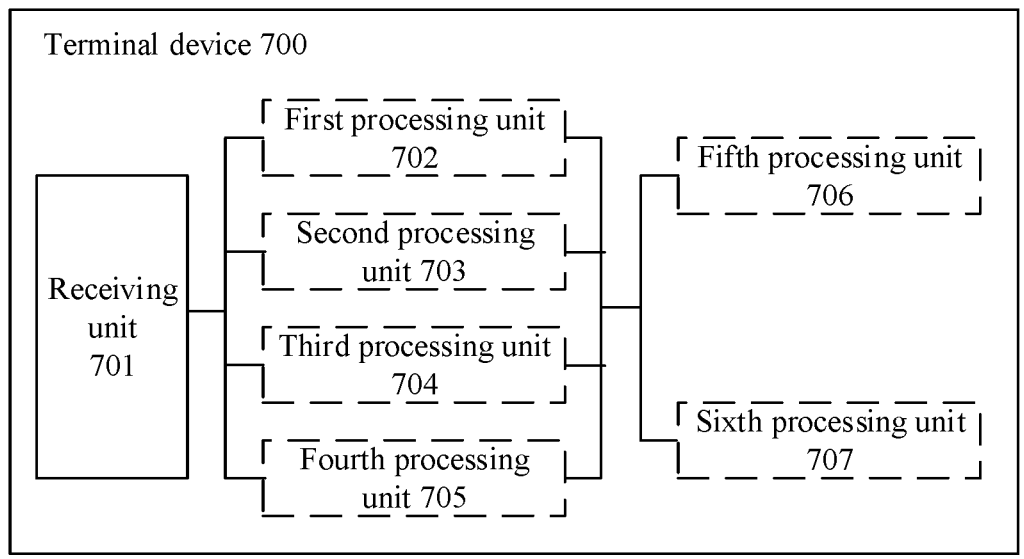
FIG. 7 is a schematic diagram of an optional composition structure of a terminal device according to an embodiment of the present disclosure.

In order to implement the above method for cell measurement, the embodiments of the present disclosure also provide a terminal device. A schematic diagram of another optional composition structure of the terminal device is illustrated in FIG. 7, the terminal device 700 includes a receiving unit 701.

The receiving unit 701 is configured to receive first indication information for instructing the terminal device whether to perform a cell measurement corresponding to a frequency point according to coverage information of a satellite. The frequency point includes a frequency point associated with the satellite.

In some optional implementations, the receiving unit 701 is further configured to receive second indication information when the first indication information is used for instructing the terminal device to perform the cell measurement corresponding to the frequency point according to the coverage information of the satellite, and the second indication information is used for indicating ephemeris information of the satellite and/or coverage information of the satellite.

In some optional implementations, the first indication information is carried in a system information message, and/or the second indication information is carried in the system information message.

In some optional implementations, the first indication information is carried in the system information message or RRC signaling, and/or the second indication information is carried in the system information message or the RRC signaling.

In some optional implementations, the coverage information of the satellite includes at least one of: an elevation angle threshold between the terminal device and the satellite; a first distance threshold of the terminal device to the satellite; a second distance threshold of the terminal device to a reference point; or location information of the reference point.

In some optional implementations, the terminal device 700 further includes a first processing unit 702.

The first processing unit is configured to measure all cells corresponding to the frequency point when a measurement starting condition is satisfied.

In some optional implementations, the terminal device 700 further includes a second processing unit 703.

The second processing unit is configured to measure a cell corresponding to the satellite when the measurement starting condition is satisfied.

In some optional implementations, the terminal device 700 further includes a third processing unit 704.

The third processing unit is configured to measure all the cells corresponding to the frequency point when signal quality of a serving cell is less than a first threshold and the measurement starting condition is satisfied.

In some optional implementations, the terminal device 700 further includes a fourth processing unit 705.

The fourth processing unit is configured to measure a cell corresponding to the satellite when the signal quality of the serving cell is less than the first threshold and the measurement starting condition is satisfied.

In some optional implementations, the signal quality includes at least one of: an RSRP, RSRQ or an SINR.

In some optional implementations, the measurement starting condition is associated with location information of the terminal device and/or the ephemeris information of the satellite.

In some optional implementation modes, the terminal device 700 further includes a fifth processing unit 706.

The fifth processing unit is configured to stop measuring all cells corresponding to the frequency point when all the satellites associated with the frequency point satisfy a measurement stopping condition.

In some optional implementation modes, the terminal device 700 further includes a sixth processing unit 707.

The sixth processing unit 707 is configured to stop measuring a cell corresponding to at least one satellite satisfying the measurement stopping condition when the at least one satellite associated with the frequency point satisfies the measurement stopping condition.

In some optional implementations, the measurement stopping condition is associated with the location information of the terminal device and/or the ephemeris information of the satellite.

In some optional implementations, the measurement starting condition includes at least one of: the elevation angle between the terminal device and the satellite being greater than or equal to the elevation angle threshold; the distance between the terminal device and the satellite being less than or equal to the first distance threshold; or the distance between the terminal device and the reference point being less than or equal to the second di stance threshold.

In some optional implementation modes, the measurement starting condition includes at least one of: the elevation angle between the terminal device and the satellite being greater than the elevation angle threshold; the distance between the terminal device and the satellite being less than the first distance threshold; or the distance between the terminal device and the reference point being less than the second distance threshold.

In some optional implementations, the measurement stopping condition includes at least one of: the elevation angle between the terminal device and the satellite being less than the elevation angle threshold; the distance between the terminal device and the satellite being greater than the first distance threshold; or the distance between the terminal device and the reference point being greater than the second distance threshold.

In some optional implementations, the measurement stopping condition includes at least one of: the elevation angle between the terminal device and the satellite being less than or equal to the elevation angle threshold; the distance between the terminal device and the satellite being greater than or equal to the first distance threshold; or the distance between the terminal device and the reference point being greater than or equal to the second di stance threshold.

Figure 8:
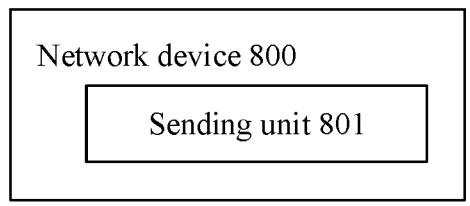
FIG. 8 is a schematic diagram of an optional composition structure of a network device according to an embodiment of the present disclosure.

In order to implement the above method for cell measurement, the embodiments of the present disclosure also provide a network device. A schematic diagram of another optional composition structure of the network device is illustrated in FIG. 8, and the network device 800 includes a sending unit 801.

The sending unit 801 is configured to send first indication information for instructing a terminal device whether to perform a cell measurement corresponding to a frequency point according to coverage information of a satellite. The frequency point includes a frequency point associated with the satellite.

In some optional implementations, the sending unit 801 is further configured to send second indication information when the first indication information is used for instructing the terminal device to perform the cell measurement corresponding to the frequency point according to the coverage information of the satellite. The second indication information is used for indicating ephemeris information of the satellite and/or coverage information of the satellite.

In some optional implementations, the first indication information is carried in a system information message, and/or the second indication information is carried in the system information message.

In some optional implementations, the first indication information is carried in the system information message or RRC signaling, and/or the second indication information is carried in the system information message or the RRC signaling.

In some optional implementation modes, the coverage information of the satellite includes at least one of: an elevation angle threshold between the terminal device and the satellite; a first distance threshold between the terminal device and the satellite; a second distance threshold between the terminal device and a reference point; or location information of the reference point.

In some optional implementations, the first indication information is used for instructing the terminal device not to perform the cell measurement corresponding to the frequency point according to the coverage information of the satellite when both a satellite cell and a terrestrial cell are deployed at the frequency point.

Alternatively, the first indication information is used for instructing the terminal device to perform the cell measurement corresponding to the frequency point according to the coverage information of the satellite when only the satellite cell is deployed at the frequency point.

The embodiments of the disclosure also provide a terminal device which includes a processor and a memory. The memory is configured to store a computer program capable of running on the processor, and the processor is configured to run the computer program to execute the operations of the above method for cell measurement executed by the terminal device.

The embodiments of the disclosure also provide a network device which includes a processor and a memory. The memory is configured to store a computer program capable of running on the processor, and the processor is configured to run the computer program to execute the operations of the above method for cell measurement executed by the network device.

The embodiments of the present disclosure also provide a chip, which includes a processor. The processor is configured to call a computer program from a memory and run the computer program to cause a device mounted with the chip to execute the above method for cell measurement executed by the terminal device.

The embodiments of the present disclosure also provide a chip, which includes a processor. The processor is configured to call a computer program from a memory and run the computer program to cause a device mounted with the chip to execute the above method for cell measurement executed by the network device.

The embodiments of the disclosure also provide a storage medium, having stored thereon an executable program which, when being executed by a processor, implements the above method for cell measurement executed by the terminal device.

The embodiments of the disclosure also provide a storage medium, having stored thereon an executable program which, when being executed by a processor, implements the above method for cell measurement executed by the network device.

The embodiments of the disclosure also provide a computer program product, which includes a computer program instruction which causes a computer to execute the above method for cell measurement executed by the terminal device.

The embodiments of the disclosure also provide a computer program product, which includes a computer program instruction which causes a computer to execute the above method for cell measurement executed by the network device.

The embodiments of the disclosure also provide a computer program, causing a computer to execute the above method for cell measurement executed by the terminal device.

The embodiments of the disclosure also provide a computer program, causing a computer to execute the above method for cell measurement executed by the network device.

Figure 9:
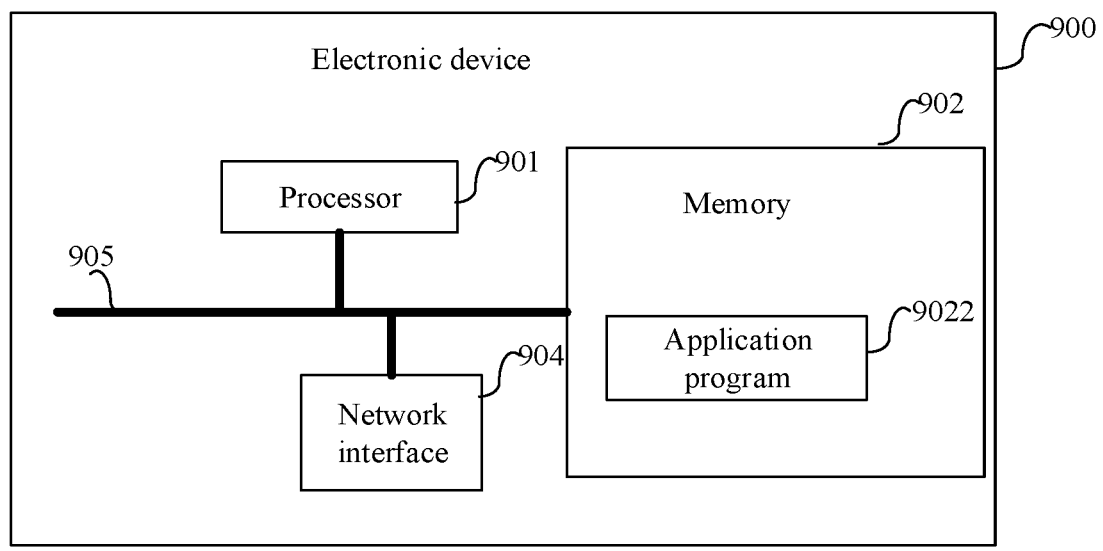
FIG. 9 is a schematic diagram of a hardware composition structure of an electronic device according to an embodiment of the present disclosure.

FIG. 9 is a schematic diagram of a hardware composition structure of an electronic device (a terminal device or a network device) according to an embodiment of the present disclosure, and the electronic device 900 includes at least one processor 901, a memory 902 and at least one network interface 904. Various components of the terminal device 900 are coupled together through a bus system 905. It is to be understood that the bus system 905 is configured to implement connection and communication between these components. In addition to a data bus, the bus system 905 further includes a power bus, a control bus and a status signal bus. However, for clarity of illustration, the various buses are labeled as the bus system 905 in FIG. 9.

It is to be understood that the memory 902 may be a volatile memory or a non-volatile memory, or may include both the volatile memory and the non-volatile memory. The non-volatile memory may be a Read-Only Memory (ROM), a Programmable ROM (PROM), an Erasable PROM (EPROM), an Electrically EPROM (EEPROM), a Ferromagnetic Random Access Memory (FRAM), a Flash Memory, a magnetic surface memory, an optical disk or a Compact Disc ROM (CD-ROM). The magnetic surface memory may be a magnetic disk memory or a magnetic tape memory. The volatile memory may be a RAM that acts as an external cache. By way of example and not limitation, many forms of RAM are available, such as a Static RAM (SRAM), a Synchronous SRAM (SSRAM), a Dynamic RAM (DRAM), a Synchronous DRAM (SDRAM), a Double Data Rate SDRAM (DDRSDRAM), an Enhanced SDRAM (ESDRAM), a SyncLink DRAM (SLDRAM), and a Direct Rambus RAM (DRRAM). The memory 902 described in the embodiment of the present disclosure is intended to include, but is not limited to, these and any other suitable types of memories.

The memory 902 in the embodiment of the present disclosure is configured to store various types of data to support operation of the electronic device 900. Examples of such data include any computer program operated on the electronic device 900, such as an application program 9022. A program for implementing the method in the embodiments of the present disclosure may be included in the application program 9022.

The method disclosed in the above embodiments of the present disclosure may be applied to the processor 901, or may be implemented by the processor 901. The processor 901 may be an integrated circuit chip with signal processing capability. During implementation, the operations of the above method may be implemented by hardware integrated logic circuits in the processor 901 or instructions in the form of software. The above processor 901 may be a general-purpose processor, a Digital Signal Processor (DSP), or other programmable logic devices, discrete gates or transistor logic devices, discrete hardware components, or the like. The processor 901 may implement or perform various methods, operations, and logical block diagrams disclosed in the embodiments of the present disclosure. The general-purpose processor may be a microprocessor, or any conventional processor. Operations of the method disclosed with reference to the embodiments of the present disclosure may be directly performed and accomplished by a hardware decoding processor, or may be performed and accomplished by a combination of hardware and software modules in the decoding processor, the software module may be located in a storage medium. The storage medium is located in the memory 902, and the processor 901 reads information in the memory 902 and implements the operations of the above method in combination with hardware thereof.

In an exemplary embodiment, the electronic device 900 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs, or other electronic elements for executing the above methods.

The present disclosure is described with reference to flowcharts and/or block diagrams of the method, the device (system) and the computer program product according to the embodiments of the present disclosure. It is to be understood that each flow and/or block in the flowcharts and/or the block diagrams and a combination of the flows and/or the blocks in the flowcharts and/or the block diagrams may be implemented by computer program instructions. These computer program instructions may be provided to a general-purpose computer, a dedicated computer, an embedded processor or processors of other programmable data processing devices to generate a machine, so that an apparatus for achieving functions designated in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, so that a manufactured product including instruction apparatus is generated by the instructions stored in the computer readable memory, and the instruction apparatus achieves the functions designated in one or more flows of the flowcharts and/or one or more blocks of the block diagrams.

These computer program instructions may also be loaded into the computers or the other programmable data processing devices, so that processing implemented by the computers is generated by executing a series of operations on the computers or the other programmable devices, and therefore the instructions executed on the computers or the other programmable devices provide steps for achieving the functions designated in one or more flows of the flowcharts and/or one or more blocks of the block diagrams.

It is to be understood that the terms "system" and "network" in the present disclosure are often used interchangeably herein. The term "and/or" in this disclosure only describes an association relationship for associated objects and represents that three relationships may exist. For example, A and/or B may represent the following three cases: Only A exists, both A and B exist, and only B exists. In addition, the character "/" in the present disclosure generally indicates an "or" relationship between the associated objects.

The description above is only the preferred embodiments of the present disclosure and is not intended to limit the scope of protection of the present disclosure. Any modifications, equivalent replacements, improvements and the like made within the spirit and principle of the present disclosure shall fall within the scope of protection of the present disclosure.

In the method for cell measurement provided by the embodiments of the present disclosure, the network device sends the system information message to the terminal device. The system information message comprises coverage information of a satellite. The terminal device performs a cell measurement corresponding to a frequency point according to the system information message, and the frequency point includes the frequency point associated with the satellite. In such way, the terminal device may perform the cell measurement corresponding to the frequency point according to the system information message based on the instruction of the network device, so that the terminal device may only perform the cell measurement corresponding to the frequency point when approaching the coverage of the satellite, thereby achieving energy saving of the terminal device.

The invention claimed is:

1. A method for cell measurement, comprising:
receiving, by a terminal device, a system information message, wherein the system information message comprises coverage information of a satellite, the coverage information of the satellite comprises a second distance threshold between the terminal device and a reference point and location information of the reference point, and wherein the reference point is a center of a ground location covered with the satellite; and
determining, by the terminal device, whether to perform a cell measurement corresponding to a frequency point according to the second distance threshold and a distance between the terminal device and the reference point, wherein the frequency point comprises the frequency point associated with the satellite.

2. The method of claim 1, wherein the coverage information of the satellite further comprises at least one of:
an elevation angle threshold between the terminal device and the satellite; or
a first distance threshold between the terminal device and the satellite.

3. The method of claim 1, further comprising:
measuring, by the terminal device, all cells corresponding to the frequency point when a measurement starting condition is satisfied.

4. The method of claim 3, wherein the measurement starting condition is associated with at least one of location information of the terminal device or ephemeris information of the satellite.

5. The method of claim 3, further comprising:
in response to all satellites associated with the frequency point satisfying a measurement stopping condition, stopping measuring, by the terminal device, all cells corresponding to the frequency point; or
in response to at least one satellite associated with the frequency point satisfying a measurement stopping condition, stopping measuring, by the terminal device, a cell corresponding to the at least one satellite satisfying the measurement stopping condition.

6. The method of claim 5, wherein the measurement stopping condition is associated with at least one of location information of the terminal device or ephemeris information of the satellite.

7. The method of claim 5, wherein the measurement stopping condition comprises:
the distance between the terminal device and the reference point being greater than the second distance threshold.

8. The method of claim 5, wherein the measurement stopping condition comprises:
the distance between the terminal device and the reference point being greater than or equal to the second distance threshold.

9. The method of claim 3, wherein the measurement starting condition comprises:
the distance between the terminal device and the reference point being less than or equal to the second distance threshold.

10. The method of claim 3, wherein the measurement starting condition comprises:
the distance between the terminal device and the reference point being less than the second distance threshold.

11. A method for cell measurement, comprising:
sending, by a network device, a system information message to a terminal device, wherein the system information message comprises coverage information of a satellite, the coverage information of the satellite comprises a second distance threshold between the terminal device and a reference point and location information of the reference point, and is used for determining whether to perform a cell measurement corresponding to a frequency point according to the second distance threshold and a distance between the terminal device and the reference point, wherein the reference point is a center of a ground location covered with the satellite, and the frequency point comprises the frequency point associated with the satellite.

12. The method of claim 11, wherein the coverage information of the satellite further comprises at least one of:
an elevation angle threshold between the terminal device and the satellite; or
a first distance threshold between the terminal device and the satellite.

13. A network device, comprising a processor and a memory configured to store a computer program capable of running on the processor, wherein the processor is configured to run the computer program to execute operations of the method for cell measurement of claim 11.

14. A terminal device, comprising:
a processor;
a memory for storing a computer program executable by the processor; and
a network interface,
wherein the processor is configured to run the computer program to:
control the network interface to receive a system information message, wherein the system information message comprises coverage information of a satellite, the coverage information of the satellite comprises a second distance threshold between the terminal device and a reference point and location information of the reference point, and wherein the reference point is a center of a ground location covered with the satellite; and
determine whether to perform a cell measurement corresponding to a frequency point according to the second distance threshold and a distance between the terminal device and the reference point, wherein the frequency point comprises the frequency point associated with the satellite.

15. The terminal device of claim 14, wherein the coverage information of the satellite further comprises at least one of:
an elevation angle threshold between the terminal device and the satellite; or
a first distance threshold between the terminal device and the satellite.

16. The terminal device of claim 14, wherein the processor is further configured to:
measure all cells corresponding to the frequency point when a measurement starting condition is satisfied.

17. The terminal device of claim 16, wherein the measurement starting condition is associated with at least one of location information of the terminal device or ephemeris information of the satellite.

18. The terminal device of claim 16, wherein the processor is further configured to:
in response to all satellites associated with the frequency point satisfying a measurement stopping condition, stop measuring all cells corresponding to the frequency point; or
in response to at least one satellite associated with the frequency point satisfying a measurement stopping condition, stop measuring a cell corresponding to the at least one satellite satisfying the measurement stopping condition.

19. The terminal device of claim 18, wherein the measurement stopping condition is associated with at least one of location information of the terminal device or ephemeris information of the satellite.

20. The terminal device of claim 16, wherein
the measurement starting condition comprises:
the distance between the terminal device and the reference point being less than or equal to the second distance threshold; or
the measurement starting condition comprises:
the distance between the terminal device and the reference point being less than the second distance threshold.

* * * * *